(12) United States Patent
Kleppe et al.

(10) Patent No.: US 10,831,008 B2
(45) Date of Patent: Nov. 10, 2020

(54) MICROSCOPE AND MICROSCOPY METHOD HAVING DIFFERENT SEQUENCES OF EVALUATING PIXELS AND SWITCHING LIGHT SOURCES

(71) Applicant: Carl Zeiss Microscopy GmbH, Jena (DE)

(72) Inventors: Ingo Kleppe, Jena (DE); Thomas Kalkbrenner, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 138 days.

(21) Appl. No.: 16/307,334

(22) PCT Filed: Jun. 2, 2017

(86) PCT No.: PCT/EP2017/063456
§ 371 (c)(1),
(2) Date: Dec. 5, 2018

(87) PCT Pub. No.: WO2017/211714
PCT Pub. Date: Dec. 14, 2017

(65) Prior Publication Data
US 2019/0137742 A1    May 9, 2019

(30) Foreign Application Priority Data

Jun. 6, 2016    (DE) .................. 10 2016 110 433

(51) Int. Cl.
*G02B 21/00* (2006.01)
*G02B 27/48* (2006.01)
(Continued)

(52) U.S. Cl.
CPC ....... *G02B 21/0032* (2013.01); *G02B 21/008* (2013.01); *G02B 21/0036* (2013.01);
(Continued)

(58) Field of Classification Search
CPC ...... G02B 21/0024–0084; G02B 21/06; G02B 21/36–367; G02B 27/10; G02B 27/48
(Continued)

(56) References Cited

U.S. PATENT DOCUMENTS

2009/0218527 A1    9/2009    French et al.
2011/0267688 A1    11/2011    Kleppe et al.
(Continued)

FOREIGN PATENT DOCUMENTS

DE    102010049627 A1    5/2011
DE    102012217967 A1    4/2014
(Continued)

OTHER PUBLICATIONS

Notification of Transmittal of Translation of the International Preliminary Report on Patentability, International Preliminary Report on Patentability, and Written Opinion of the International Searching Authority dated Dec. 20, 2018.
(Continued)

*Primary Examiner* — Ryan S Dunning
(74) *Attorney, Agent, or Firm* — Duane Morris LLP

(57) ABSTRACT

A microscope having an imaging beam path, an illumination beam path, a detection device, and a control device for controlling the detection device and the illumination device. The control device divides the light sources of the detection device in an array into at least a first and a second group, wherein each group is composed of light sources adjacent to each other in the array and covers part of the array. The control device switches on only one light source of the first group at a point in time and connects the light sources of the first group in a sequence with a clocking in such a way that two light sources switched on one after the other are adjacent to each other in the array and switches the light sources of the second group with the same clocking as the light sources
(Continued)

of the first group. The control device reads out the detection device with the same clocking as the connecting of the light sources.

18 Claims, 4 Drawing Sheets

(51) Int. Cl.
G02B 21/36 (2006.01)
G02B 27/10 (2006.01)
(52) U.S. Cl.
CPC ....... *G02B 21/0072* (2013.01); *G02B 21/367* (2013.01); *G02B 27/48* (2013.01); *G02B 21/0076* (2013.01); *G02B 27/10* (2013.01)
(58) Field of Classification Search
USPC .................................. 359/385, 388
See application file for complete search history.

(56) References Cited

U.S. PATENT DOCUMENTS

| 2014/0146376 | A1 | 5/2014 | Kleppe et al. |
| 2015/0253557 | A1 | 9/2015 | Kalkbrenner |
| 2015/0378141 | A1 | 12/2015 | Bathe et al. |
| 2016/0231551 | A1 | 8/2016 | Berner |
| 2017/0276544 | A1* | 9/2017 | Gastaldo ............ H01L 22/12 |

FOREIGN PATENT DOCUMENTS

| DE | 102013001238 A1 | 7/2014 |
| DE | 102013218231 A1 | 3/2015 |

OTHER PUBLICATIONS

DeLuca, Giulia M.R., et al.; "Re-scan confocal microscopy: scanning twice for better resolution"; Biomedical Optics Express 2013; 4(11):2644-2656.
Donner, Gerald, et al.; "Triplet-relaxation microscopy with bunched pulsed excitation"; Photochemical & Photobiological Sciences 2009; 8:481-485.
Li, Long, et al.; "Nano-displacement measurement based on virtual pinhole confocal method"; Measurement Science and Technology 2013; 24:1-11.
Muller, Claus B., et al.; "Image Scanning Microscopy"; Physical Review Letters 2010; 104:198101-1-198101-4.
Poher, V., et al.; "Optical sectioning microscopes with no moving parts using a micro-stripe array light emitting diode"; Optics Express 2007; 15(18):11196-11206.
York, Andrew G., et al.; "Resolution doubling in live, multicellular organisms via multifocal structured illumination microscopy"; Nature Methods:doi:10.1038/nmeth.2025; 1-6.
York, Andrew G., et al.; "Instant super-resolution imaging in live cells and embryos via analog image processing"; Nature Methods:doi:10.1038/nmeth.2687; 1-5.
Zheng, Guoan, et al.; "Microscopy refocusing and dark-field imaging by using a simple LED array"; Optics Letters 2011; 36(20):3987-3989.
International Search Report and Written Opinion dated Sep. 11, 2017.

* cited by examiner

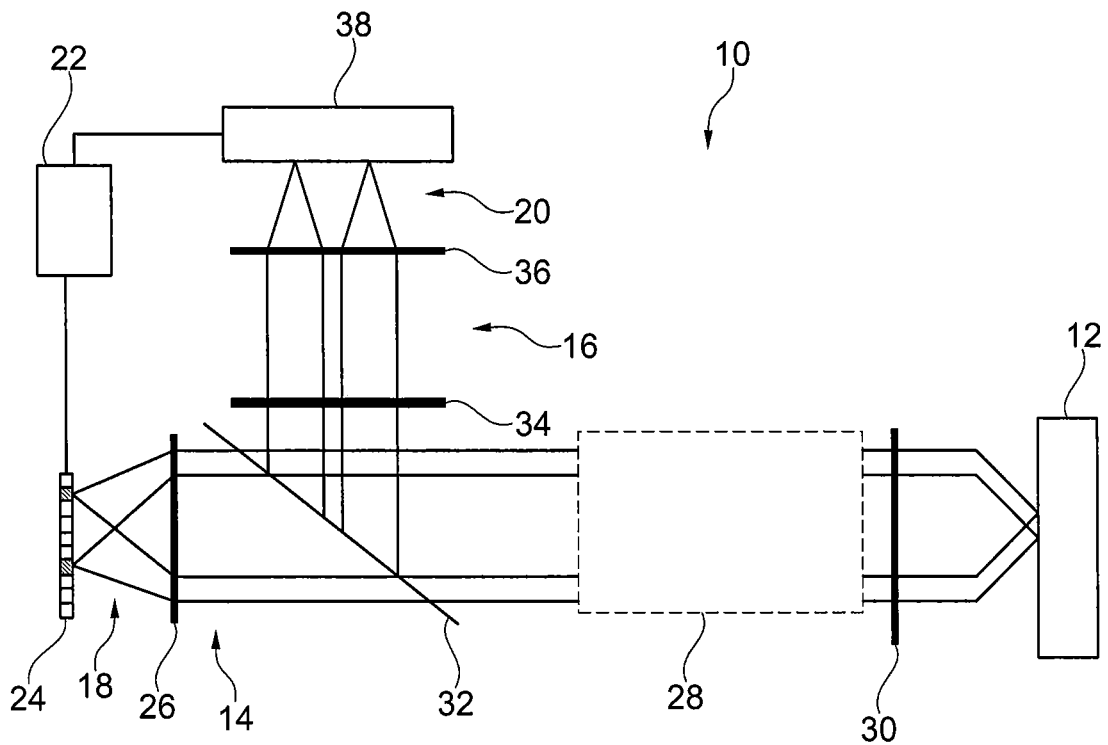
Fig. 2
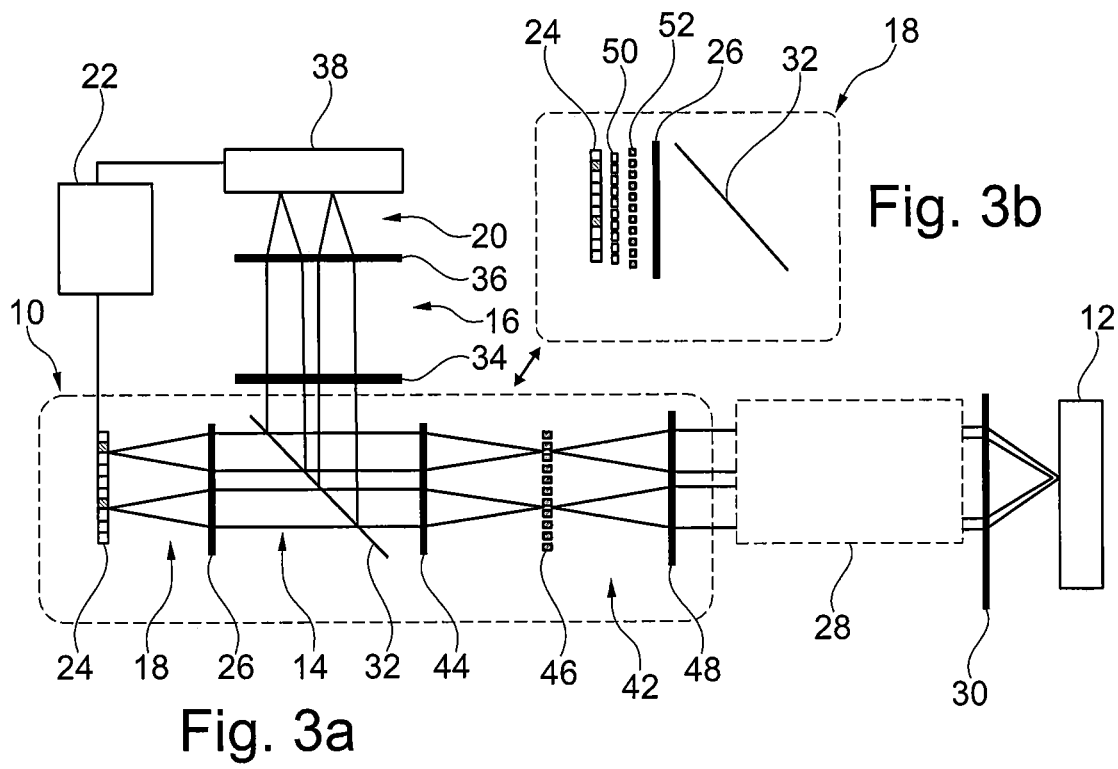
Fig. 3a
Fig. 3b

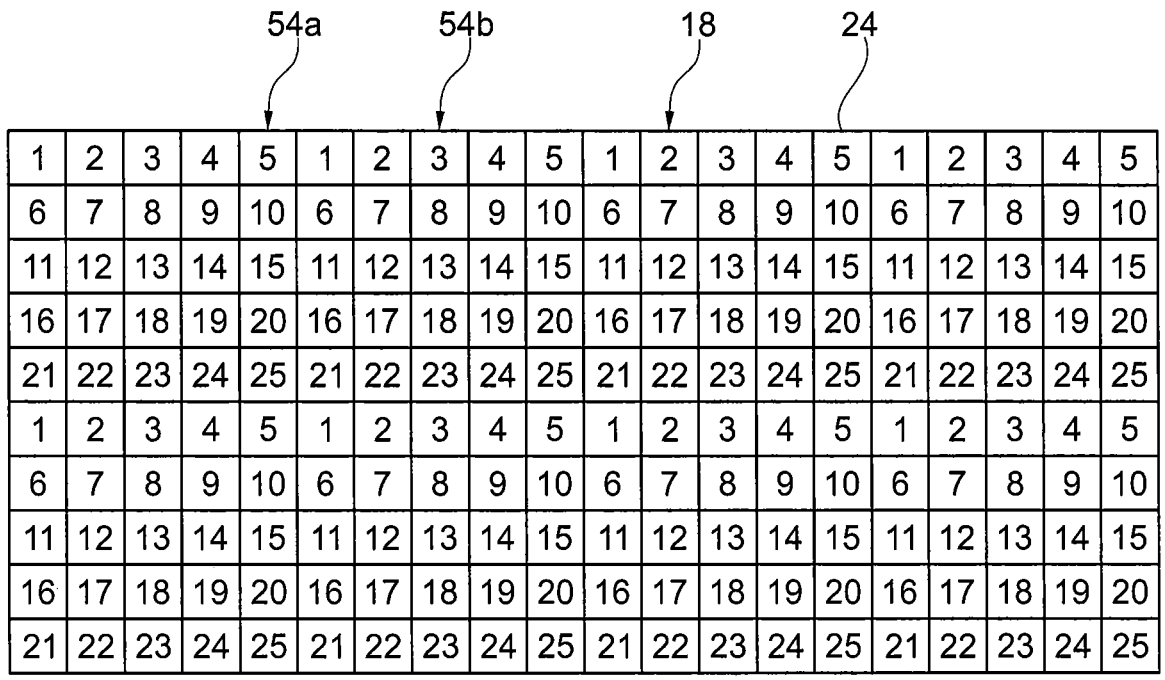
Fig. 5
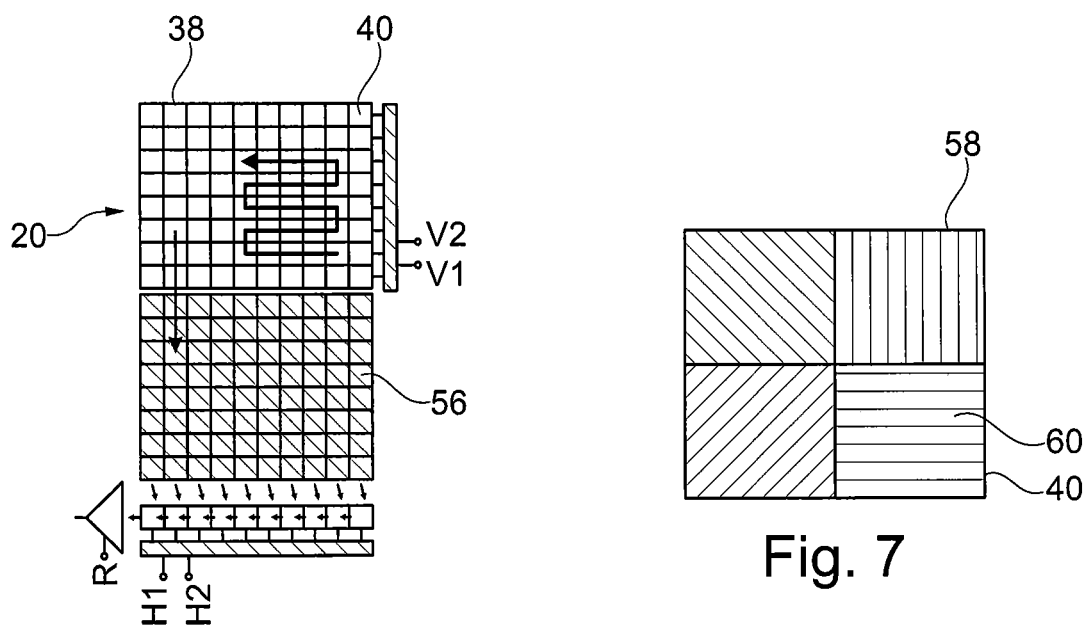
Fig. 6
Fig. 7

MICROSCOPE AND MICROSCOPY METHOD HAVING DIFFERENT SEQUENCES OF EVALUATING PIXELS AND SWITCHING LIGHT SOURCES

RELATED APPLICATIONS

The present application is a U.S. National Stage application of International PCT Application No. PCT/EP2017/063456 filed on Jun. 2, 2017 which claims priority benefit of German Application No. DE 10 2016 110 433.7 filed on Jun. 6, 2016, the contents of each are incorporated by reference in their entirety.

FIELD OF THE INVENTION

The invention relates to microscope for imaging an object, comprising an object plane for arranging the object, an imaging beam path, an illumination beam path, a detection device, and a control device. The invention furthermore relates to a microscopy method for imaging an object, comprising the following steps: arranging the object in an object plane; imaging the object with a resolution that determines a minimum diameter in the object plane from the object plane into an image plane using an imaging beam path.

BACKGROUND OF THE INVENTION

In confocal microscopes, it is possible to achieve a resolution which is better than the diffraction limit that is determined by the microscope when the object is scanned with a step width that is smaller than the diffraction limit. Reference is made in this context by way of example to DE 102010049627 A1. Is furthermore known to realize the scanning movement for illuminating the object not using mechanical parts, but using an array of light sources, as is described, for example, in DE 102012217967 A1 or in the article G. Zheng et al., Microscopy refocusing and dark-field imaging by using a simple LED array, Oct. 15, 2011, Vol. 36, No. 20, Optics Letters. A. G. York et al., Resolution doubling in live, multicellular organisms via multifocal structured illumination microscopy, May 13, 2012, Nature Methods, describe how the signal-to-noise ratio can be improved by adding the signals of a plurality of confocal imagings. A. G. York et al., Instant super-resolution imaging in live cells and embryos via analog image processing, Oct. 6, 2013, Nature Methods, describe how the readout of detectors can be accelerated.

US 2009/0218527 A1 proposes a confocal microscope comprising a light source made up of a 2D LED array.

Moreover, DE 102013001238 A1 discloses a method for reducing the calculation complexity for evaluating the signals from the detection device in a high-resolution microscope. Such a method will be explained with reference to FIG. 1. Said figure schematically illustrates a section through a sample along the x-axis. The sample comprises a fluorescent sample point 110. Also illustrated is an illumination spot 112. The intensity I thereof is indicated on the ordinate. The dimensions of the illumination spot 112 can be diffraction-limited and are greater in the x-direction than the sample point 110. If the illumination spot 112 impinges on the sample point 110, the latter is excited to fluorescence and emits sample light, which can be detected by a detector device. In FIG. 1, a projection, here infinitely sharp, of the detector device 114 is furthermore plotted into the sample plane. The detector device 114 comprises a plurality of detector elements 116, 118. The latter receive not only sample light coming from a single point of the sample. Rather, imaged onto each detector element 116, 118 is an extended receiving region which is determined by the PSF (point spread function) of the imaging. The PSF for the detector element 118 is illustrated in the form of a dashed curve 120. The dimensions of the illumination spot 112 can likewise be determined by a PSF of a point light source. The light intensity measured by a specific detector element 118 is then determined by a total PSF, which is the product of the PSF for the illumination spot 112 and the PSF 120 for the detector element 118. The maximum of the total PSF is situated approximately centrally between the illumination spot 112 and the PSF 120 of the respective detector element 118. In the illustrated example, the detector element 118 therefore receives light mainly from a site 122A, which is situated centrally between the illumination spot 112 and the PSF 120. By contrast, the detector element 118 measures hardly any light at the position 122D, even though the associated PSF 120 has its maximum here. For scanning the sample, the illumination spot is now shifted from the position 124D to 124B, for example. This is referred to here as an illumination scanning movement. As a result, the total PSF of the detector element 118 shifts. The latter now no longer measures light from mainly the position 122A, but from 122B. This situation can be used to increase resolution. To this end, the detector elements are read for each position of the illumination spot 112. The sample light signals measured in the process are assigned to different sample regions in dependence on the position of the illumination spot 112. That means that the sample light signals measured by one and the same detector element are rearranged in dependence on the position of the illumination spot 112.

The rearrangement is illustrated by way of the curved solid arrows below the transverse axis. Accordingly, a signal of the detector element 118 is assigned to the site 122A of the object 110 when an illumination spot is located at the location 124D. Analogously, a signal of the detector element at the site 122C is assigned to the site of the object 110 in the case of an illumination spot at the location 124C. A signal of the detector element 122B is also assigned to the site of the object 110 in the case of an illumination spot at the location 124B. In this way, it is possible to obtain a resolution improvement. The outlay in terms of apparatus for achieving this rearrangement, however, is great. In addition, the time needed to calculate the rearrangement is relatively long.

The improvement in resolution can also be described as a greater weighting of the higher spatial frequencies in the optical transfer spectrum of a single spot system. Since for the image production the light distribution within a 1-Airy pinhole diameter is used, more photons can be detected. The signal-to-noise ratio is thus improved. The sample region from which a specific detector element receives the greatest amount of light depends, as explained with reference to FIG. 1, on the position of the illumination pattern or illumination spot on the sample. Due to the illumination scanning movement, the illumination pattern is shifted over the sample. As a result, the total PSF also shifts and consequently the sample region from which a specific detector element receives the greatest amount of light.

As an advantage, it is possible by way of the detection scanning movement, that a specific detector element receives light mainly always from the same sample region. The site of the maximum of the total PSA is thus, if possible, hardly changed by the illumination and detection scanning movement. To this end, the detection scanning movement must be opposite the illumination scanning movement and take place at the same time. The effect of an opposite movement between the detection scanning movement and the illumination scanning movement is likewise explained with reference to FIG. 1. In the situation illustrated, the detector element 118 receives mainly light from the region 122A. The total PSF has its maximum here. In the illumination scanning movement, the illumination spot 112 is then moved in the direction of the arrow 126, for example until the maximum thereof is at the position 124C. At the same time, in a detection scanning movement, the receiving region of the detection element 118 is moved in the opposite direction, that is to say in the arrow direction 128. The receiving region of the detection element 118 can be considered to be an extent of the PSF 120 thereof to the first minima of PSF 120. If it is moved in the arrow direction 82 until the maximum thereof is at the position 122C, the maximum of the total PSF of the detector element 118 continues to be at the position 122A. Advantageously, it is hereby possible to avoid the rearrangement described with respect to the prior art, in which the receiving signals of a specific detector element are assigned to different sample positions in dependence on the position of the illumination spot.

SUMMARY OF THE INVENTION

The invention is based on the object of providing a microscope and a microscopy method, in which the imaging of the object can be simplified.

The object is achieved by way of the microscope as claimed in claim 1 and by way of the microscopy method as claimed in claim 10. The dependent claims describe preferred exemplary embodiments of the invention.

The invention provides a microscope for imaging an object, comprising an object plane for arranging the object, an imaging beam path, an illumination beam path, a detection device, and a control device. The imaging beam path images the object with a resolution defining a minimum diameter in the object plane from the object plane into an image plane. The illumination beam path projects illumination radiation from an illumination device into the object plane, wherein the illumination device comprises a multiplicity of light sources and the light sources have—projected into the object plane—the form of a 2D array, wherein adjacent light sources in the array are arranged at a distance from one another that is smaller than the minimum diameter. The detection device comprises a multiplicity of detection pixels, wherein the detection pixels have—projected into the object plane—the form of the 2D array. Thus, adjacent detection pixels in the array are arranged at a distance from one another that is smaller than the minimum diameter. The control device controls the detection device and the illumination device, wherein the control device divides the light sources in the array into at least one first and one second group, wherein each group is made up of light sources which are mutually adjacent in the array and covers a part of the array. The control device switches on only one light source of the first group at a time and switches the light sources of the first group in a clocked sequence, wherein the light sources of the second group are switched with the same clocking as the light sources of the first group. The microscope is characterized by the fact that each detection pixel in the array is assigned exactly one light source, wherein the control device reads the detection device with the same clocking as it switches the light sources.

In particular, the readout is done such that the control device for each group adds up signals of the detection pixels, which are produced by incident radiation of the imaging beam path in a time period corresponding to the clocking, in a sequence that is reversed with respect to the sequence of switching the light sources. In the microscope, each detection pixel is assigned exactly to one light source. Thus, light that is emitted or reflected by the object is detected mainly by a corresponding detection pixel during the illumination of the object with one of the light sources. By reading the detection device each time after one or more light sources was switched on, it is possible to generate of confocal imaging of the object without parts in the microscope needing to be mechanically moved. As a result, the recording speed of the microscope can be increased, because it is no longer necessary to mechanically move elements of the microscope, which is known to reduce the recording speed of the microscope.

The microscope preferably serves for confocal imaging of the object, wherein a plurality of pinholes, in particular in the form of a pinhole array, can be provided for confocal imaging. Alternatively, the detection pixels can provide a virtual pinhole such that no pinhole stops need to be provided in the imaging beam path. The construction of the microscope can be simplified further in this way.

The object in particular comprises fluorescent structures, for example fluorescent dyes. In particular, the radiation of the illumination beam path is such that in the object the emission of fluorescence light is excited. The microscope preferably comprises a beam splitter device, by way of which radiation of the imaging beam path can be separated from radiation of the illumination beam path. The detection device is embodied in particular for detecting radiation in the wavelength range of the emission spectrum of the fluorescence light of the object.

The imaging beam path defines, on the basis of the optical elements thereof and/or of other elements, a minimum resolvable diameter in the object plane. The minimum diameter preferably corresponds to the Airy diameter to which point emitters are imaged from the object plane into the image plane. The detection pixels of the detection device are, projected into the object plane, arranged in a 2D array, wherein the imaging beam path of the detection pixels projects into the object plane such that detection pixels in the object plane have a distance that is smaller than the minimum diameter, in particular smaller than the Airy diameter. Such detection pixels can produce a high-resolution image of the object, as is known from the prior art. A detection pixel can comprise a plurality of pixels or elements, which are embodied in each case for converting incident radiation into electrical signals.

The illumination device can be embodied in the form of a display or monitor, wherein the individual pixels of the monitor or of the display form the light sources. It is furthermore possible for the illumination device to comprise an array of light-emitting diodes (LEDs), wherein the individual LEDs correspond to the light sources. The illumination beam path comprises optical elements and other elements, which image the light sources into the object plane such that the distance between two light sources is smaller than the minimum diameter, in particular smaller than the Airy diameter. The arrangement of the light sources in the illumination device is again such that the light sources form a 2D array in the object plane. In the microscope, provision is made for each detection pixel to be assigned exactly to one light source. In particular, as many detection pixels as light sources are provided. The array of the detection pixels projected into the object plane is preferably identical to the array of the light sources projected into the object plane.

The control device can be for example a microprocessor, a computer having a correspondingly configured computer program, or another electric circuit. The control device is data-technologically connected to the detection device and produces an image of the object from the electrical signals of the detection pixels.

The control device divides the light sources in the array, i.e. when seen in projection into the object plane, into at least two groups; however, three or more groups can also be provided. A plurality of first and/or a plurality of second groups are preferably provided, wherein each first and/or second group forms a recording spot, with the result that multispot illumination of the object can be realized. The number of the first and/or second groups determine the spots of the multispot illumination. A group of light sources is intended to be used to illuminate a specific point on the sample in a manner such that the displacement of the illumination of the object through switching-on of the different light sources of this group is less than the minimum diameter, in particular less than the Airy diameter. For example, the light sources are located, projected into the object plane, to be adjacent to one another, wherein in particular the light sources of two different groups, projected into the object plane, are spaced apart from one another by at least the minimum diameter, in particular more than the Airy diameter. In this way, crosstalk between the individual illumination spots can be reduced or entirely avoided. The individual light sources of a group are switched in a sequence, i.e. only one light source of the respective group is switched on at a time for example. The sequence in which the group is switched on is for example such that light sources, which have been switched on one after the other, are spaced apart from one another in the object plane. Corresponding light sources of two groups are preferably switched on at the same time, i.e., when for example the light sources of the first groups are switched on, all light sources of the respective sequence emit light at the same time. The light sources are preferably switched such that two light sources which have been switched on one after the other in the array are adjacent to one another.

The control device reads the detection device with the same clocking as the switching of the individual light sources. In particular, the detection pixels of the detection device are exposed to light over a period in a read cycle, which corresponds to the clock cycle. The detection pixels produce signals which correspond to the intensity of the radiation that is incident on the respective detection pixel and to the duration of the incident radiation. The signals of the individual detection pixels are evaluated by the control device, specifically such that the signals are evaluated in a sequence which is reversed with respect to the sequence of the switching-on of the light sources. In this way, the method described in DE 102013001238 A1 can be simulated without moving mechanical parts being necessary. It is hereby furthermore possible to increase the imaging speed.

Reading the detection device can be done in different ways. In a first variant, it is preferred that the control device reads all detection pixels at the same time. For example, charge-coupled devices (CCD sensors) can be used therefor. In this embodiment, all detection pixels are read simultaneously per clock cycle after the light sources of the different groups have been switched on and off. After reading, the light sources of the individual groups that come next in the sequence are switched on. To produce the image of the object, preferably the control device evaluates the signals produced by the detection pixels, wherein the signals are redistributed by the control device in the sequence that is reversed with respect to the sequence of switching the light sources. Consequently, only the signals of the detection pixels which receive radiation from the switched-on light sources are evaluated per read cycle. The control device consequently performs the redistribution and adding up of the signals in accordance with the sequence of the switching on and off of the light sources (known from the prior art). The advantage of this embodiment is that known methods for reading detection devices can be used.

In this embodiment, the redistribution and adding-up of the signals of the detection pixels is performed by the control device. In another variant, the evaluation of the signals can be achieved by way of the control device for each group reading the detection pixels in the corresponding part of the array in a succession that is reversed with respect to the sequence. In particular, the control device for each group reads only the detection pixels which correspond to the associated light sources in the respective clock cycle. That means that reading of the detection pixels is performed such that only the detection pixels which are associated with switched-on light sources are read per clock cycle. In this way, the evaluation is performed not by picking out the signals which are associated with the individual switched-on light sources, but the assignment is effected by only the corresponding detection pixels being read. In this way, the calculation complexity is significantly reduced.

In a sub-variant of this embodiment, it is preferred that the control device reads signals of the detection pixels which are produced by incident radiation of the imaging beam path, wherein the detection pixels remain exposed to light in a time period until all light sources have been switched through. The detection pixels of this embodiment can comprise for example active pixel sensors, which are produced in CMOS technology. The control device now only needs to evaluate the signals of the individual detection pixels in the corresponding sequence. As compared to the conventional variants for determining a sub-Airy resolution, the control device now no longer needs to redistribute the signals of the detection pixels per read cycle, because this redistribution is performed directly in the detection pixels by the exposure of the detection pixels to light over different read cycles. The control device only needs to read the detection pixels which have been exposed to light over a plurality of clock cycles taking into account the clock cycle of the switching of the light sources. In this way, the calculation complexity is reduced.

In a further sub-variant, the detection device comprises a CCD array sensor, wherein the signals are charges, and the charges are shifted in the detection pixels for redistribution. In this variant, the signals are the charges produced in the CCD sensor by radiation coming from the imaging beam path. The mechanical motion for redistribution described in DE 102013001238 A1 is here realized by way of the charges of the individual detection pixels being shifted. In conventional CCD sensors, each read cycle shifts the charges which are accumulated in each detector pixel and which are in particular proportional to a light quantity that was incident on said detector pixel to a read row, and a readout register converts the charges by current-voltage converters into a signal. These sensors are referred to as interline transfer CCD sensors (IT CCD). Also available are frame transfer CCD (FT CCD) sensors, in which all charges are shifted for reading to a readout frame. The read rows or read out frames in conventional CCD sensors are arranged such that they are not exposed to light during reading. In the CCD sensors used with respect to this embodiment of the microscope, the charges of the individual detection pixels are not shifted into non-exposed regions, but to an adjacent detection pixel located in a sequence that is reversed with respect to the sequence of switching the light sources. Due to this shifting, charges are redistributed, because the detection pixels are always exposed to light. If the sequence of the shifting is finished, preferably all charges of the detection pixels are moved to a readout frame. The shifting of the charges is performed, as already mentioned, according to the clocking of the switching-on of the light sources.

The shifting of the charges in CCD sensors can be effected very rapidly. For example, the entire field of a multispot illumination can be shifted within 36.4 μs at a clock of 11 MHz (typical value for electron multiplying CCD (EM-CCD)). The frame transfer and the read process typically take approximately 30 ms, which means that it is not the shifting of the charges or the switching-on of the light sources that is limiting, but the read process. The reading can be accelerated if only specific parts of the detection device are used for reading, i.e., some detection pixels are not used for reading, which is equivalent to cropping of the detection device. In this way, the reading can be accelerated and 30 to 100 frames per second can be produced, which is considerably faster than in conventional microscopes, in which parts are to be moved mechanically.

In an alternate embodiment, it is preferred that for reading the detection device, the control device reads per clock cycle only the detection pixels that are assigned to the respective switched-on light source in the corresponding part of the array, wherein the control device calculates diffraction images of the object from information of the individual detection pixels in dependence on the switched-on light sources. This represents a simplified variant of the embodiment, in which all detection pixels per clock cycle are read. In this case, the control device reads only those pixels that are actually needed for the subsequent evaluation, and as a result, the reading complexity can be significantly reduced and thus the reading speed and the time for calculating the diffraction image can be reduced. The detection pixels of this embodiment can comprise for example active pixel sensors, which are produced in CMOS technology.

For illuminating the object in different colors, it is preferred that the illumination device, projected into the object plane, can produce illumination radiation having at least two different wavelength ranges, wherein preferably the control device controls the light source with respect to the wavelength ranges such that light sources emitting radiation of different wavelength ranges have—projected into the object plane—a distance which is greater than the minimum diameter, in particular greater than the Airy diameter. To produce different wavelength ranges for the illumination of the object, each detection pixel can be embodied to produce light in different wavelength ranges. Alternatively, a plurality of illumination points, such as LEDs for example, can form a light source, wherein the radiation produced by the illumination points illuminates, projected into the object plane, an identical region with identical intensity distribution. To this end, for example, the radiation of the individual illumination points can be combined via a beam splitter device. The switching-on of the individual light sources for each wavelength range is effected as described above. In order to avoid crosstalk of the radiation of the imaging beam path, provision is made for light sources, which are switched on at the same time per timing cycle and emit radiation of different wavelength ranges, to be spaced apart in the object plane by at least the minimum diameter, in particular the Airy diameter. For example, light sources which are switched on per timing cycle and emit light of the same wavelength range can be spaced apart from one another by two minimum diameters, in particular two Airy diameters, in the object plane, wherein preferably in the object plane, between these two switched-on light sources of one wavelength range, a light source is switched on which emits radiation of a different wavelength range.

The minimum distance in the object plane of one minimum diameter applies in particular in both directions of the array. In this embodiment, it is possible to provide multispot illumination of the object in different colors, in which crosstalk between the colors can be avoided.

For detecting different colors, the radiation of the imaging beam path can be divided depending on the wavelength range for example using a beam splitter and be imaged onto different arrays of detection pixels, which are embodied in each case for detecting the corresponding wavelength range. In another embodiment, it is preferred that each detection pixel comprises at least two color pixels, wherein arranged upstream of each color pixel is a different color filter and wherein the control device preferably reads all color pixels of a detection pixel at the same time. In this variant, the principle of a Beyer matrix is used. Each detection pixel thus comprises a plurality of subpixels or color pixels, which are embodied for detecting radiation of different wavelength ranges. In order to avoid crosstalk, arranged upstream of each color pixel in the imaging beam path is a color filter that lets through only radiation of the wavelength range that is to be detected using the respective color pixel. The color pixels can be identical and detect radiation over a large wavelength range, wherein the color filters are used to perform splitting into the different wavelength ranges of the emission spectrum splitting. Alternatively, the color pixels can be embodied to detect with great sensitivity the respective wavelength range, the radiation of which is transmitted by the color filter.

If fluorescent dyes are illuminated over a prolonged period, the likelihood increases that they are in a triplet state and photobleach out of it. In order to prevent this, it is preferred that the control device switches the individual light sources in the sequence at least twice and in each case reads the detection device. In this way, a prolonged illumination of the object to increase the signal-to-noise ratio is achieved not by way of the respective light sources being illuminated longer, but by being switched more often with shorter exposure times. For example, the frequency of the illumination can be within the megahertz range. Since no moving mechanical parts are provided in the microscope, this is highly realizable in a simpler manner, with the result that the risk of photobleaching in the microscope can be advantageously avoided. The control device averages in particular the signals of the individual read cycles.

The invention furthermore provides a microscopy method for imaging an object, comprising the following steps: arranging the object in an object plane; imaging the object from the object plane into an image plane using an imaging beam path with a resolution that defines a minimum diameter in the object plane, in particular an Airy diameter; projecting illumination radiation from an illumination device into the object plane using an illumination beam path, wherein the illumination device comprises a multiplicity of light sources and the light sources have—projected into the object plane—the form of a 2D array, wherein adjacent light sources in the array are arranged at a distance from one another that is smaller than the minimum diameter; detecting radiation from the imaging beam path with a detection device, which comprises a multiplicity of detection pixels, wherein the detection pixels have—projected into the object plane—the form of the 2D array, wherein adjacent detection pixels in the array are arranged at a distance from one another that is smaller than the minimum diameter, and wherein each detection pixel in the array is assigned to exactly one light source; dividing the light sources in the array into at least one first and one second group, wherein each group is made up of light sources which are mutually adjacent in the array and covers part of the array; switching on only one light source of the first group at a time, switching the light sources of the first group in a timing cycle, and switching the light sources of the second group with the same timing as the light sources of the first group; and reading the detection device with a timing that is identical to the switching of the light sources.

It goes without saying that the aforementioned features and those yet to be explained below can be used not only in the combinations specified but also in other combinations or on their own, without departing from the scope of the present invention.

BRIEF DESCRIPTION OF THE FIGURES

The invention is explained in more detail below for example on the basis of the accompanying drawings, which also disclose features essential to the invention. In the figures:

FIG. 2 is a schematic illustration of the setup of a microscope;

FIGS. 3a, and 3b show embodiments of the microscope illustrated in FIG. 2;

FIG. 5 is an illustration which depicts the switching on of the light sources with different wavelength ranges;

FIG. 6 is an illustration of a detection device of the microscope from FIGS. 2 and 3; and FIG. 7 is a schematic illustration of a detection pixel of the detection device.

DETAILED DESCRIPTION OF THE EMBODIMENTS

Figure 1:
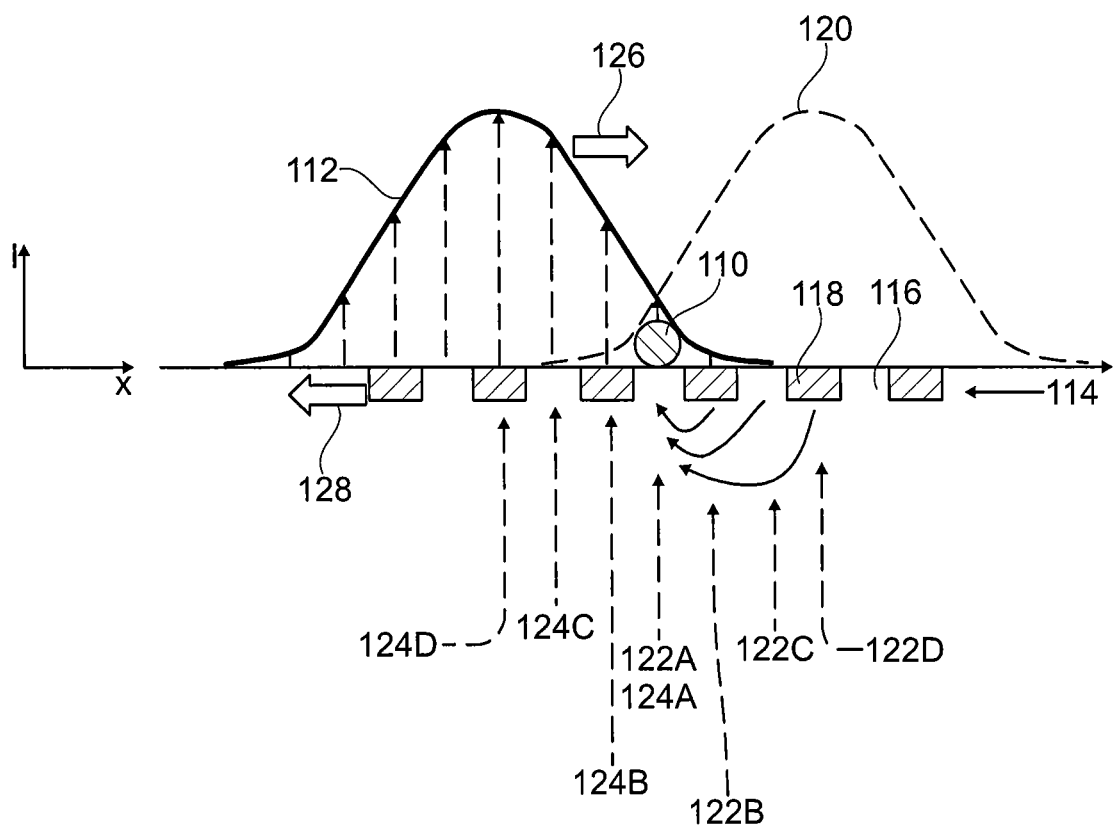
FIG. 1 illustrates a principle, known from the prior art, of signal generation in detector elements, whose distance with respect to one another is smaller than a minimum diameter.

A microscope 10 serves in particular for confocal imaging of an object 12 at a resolution that is below the diffraction limit of the imaging of the object 12. To this end, the microscope 10 comprises an illumination beam path 14, an imaging beam path 16, an illumination device 18, a detection device 20, and a control device 22.

The illumination device 18 comprises a multiplicity of light sources 24 and an illumination optical unit 26. The light sources 24 are arranged in a 2D array, and are connected in each case data-technologically to the control device 22 via an electric line, such that the control device 22 can switch the individual light sources 24 on and off in each case. The light sources 24 are each configured to produce radiation having different wavelength ranges. The illumination optical unit 26 has a focal length corresponding to a distance between the multiplicity of the light sources 24 and the illumination optical unit 26, with the result that the radiation emitted by the light sources 24 is parallelized after passage through the illumination optical unit 26. The light sources 24 are imaged into an object plane of the microscope in which the object 12 is located via the illumination beam path 14.

The illumination beam path 14 comprises a zoom optical unit 28 and an objective 30. The zoom optical unit 28 changes the magnification scale of the imaging of the light sources 24 into the object plane of the object 12. The objective 30 focuses the radiation of the illumination beam path 14 into the object plane of the object 12. The light sources 24 are arranged such that they are arranged, projected into the object plane, in a 2D array, wherein the distance between the light sources 24 that are projected into the object plane is smaller than a minimum diameter, in particular smaller than an Airy diameter, which is defined by the imaging beam path 16.

The object 12 contains fluorescent dyes which are excited by the radiation produced by the light sources 24. The fluorescent dyes in the object 12 emit fluorescent light which is imaged onto the detection device 20 via the imaging beam path 16. The imaging beam path 16 comprises the objective 30, the zoom optical unit 28, a beam splitter 32, and an emission filter 34. The objective 30 collects the fluorescent radiation which was emitted by the object 12 and is incident on the beam splitter 32 by way of the zoom optical unit 28. The beam splitter 32 is embodied in the form of a dichroic mirror, which allows the radiation of the illumination beam path 14 to pass and reflects the radiation of the imaging beam path 16. The radiation of the imaging beam path 16 is guided onto the emission filter 34, which is embodied to block radiation in the wavelength range of the radiation emitted by the light sources 24 and to transmit radiation in the spectral range of the emission spectrum of the fluorescent dyes provided in the object 12. The radiation of the imaging beam path 16 passes from the emission filter 34 to the detection device 20.

Figure 4:
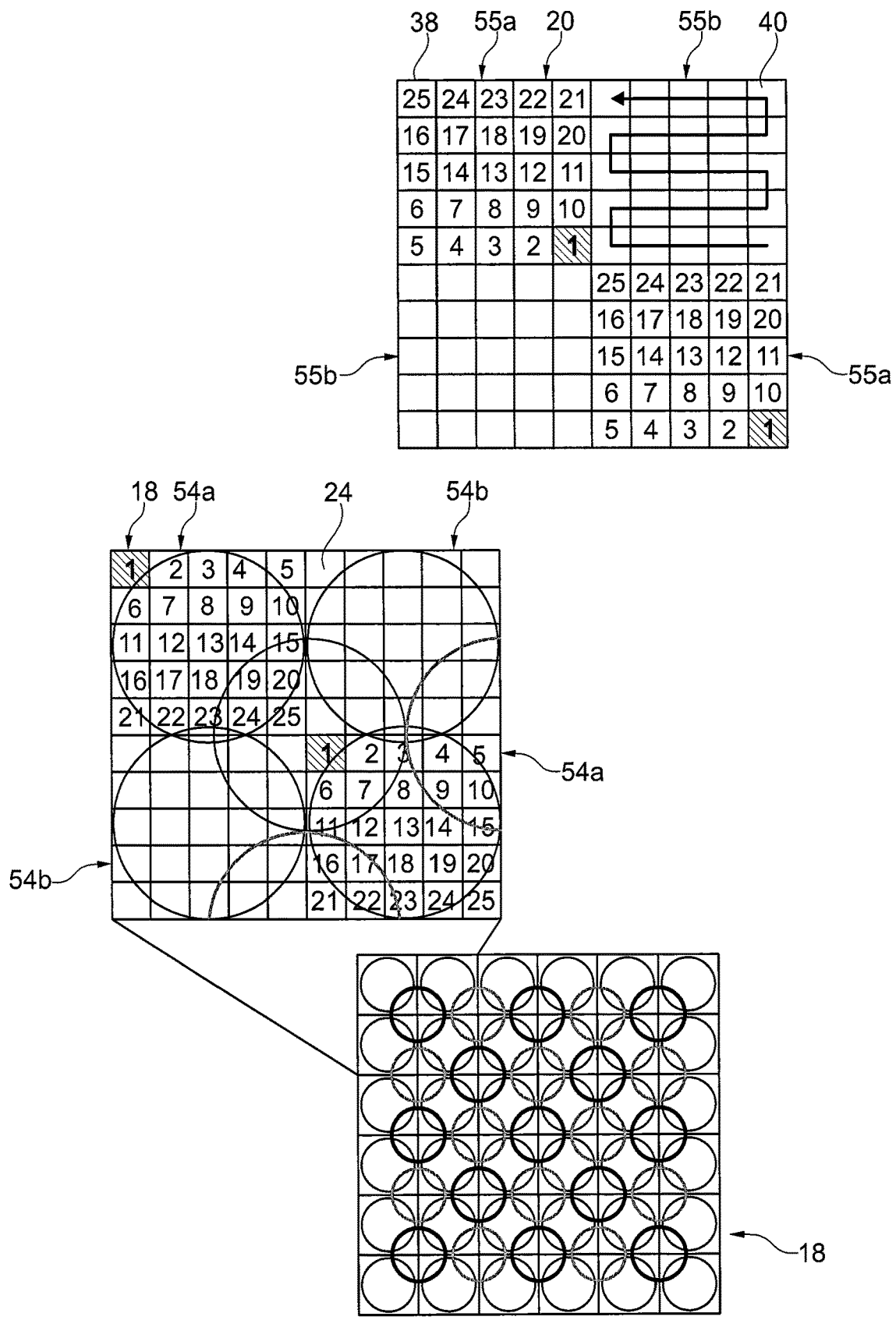
FIG. 4 is an illustration for controlling for switching on light sources and reading detection pixels of the microscope illustrated in FIGS. 2 and 3a and 3b.

The detection device 20 comprises an imaging optical unit 36 and a camera 38, which comprises a multiplicity of detection pixels 40 (cf. FIGS. 4 and 6). The imaging optical unit 36 focuses the parallel radiation of the imaging beam path onto the camera 38. Theoretically, if the detection pixels 40 were to be projected via the imaging beam path 16 into the object plane of the object 12, the individual detection pixels 40 would be arranged there in a 2D array. The array of the detection pixels 40 which are also actually projected into the object plane identically overlaps with the array of the light sources 24 projected into the object plane. The detection pixels 40 are connected in each case by data links with the control device 22, with the result that the control device 22 can individually drive and read the detection pixels 40. The control device 22 is embodied for example in the form of a microprocessor. The detection pixels 40 serve as virtual pinholes for the confocal imaging of the object 12.

Further embodiments of the microscope 10 are described in connection with FIGS. 3a and 3b. The embodiments of the microscope in accordance with FIGS. 3a and 3b are in line with the microscope according to FIG. 2 except for the following differences: The microscope according to FIG. 3a additionally comprises a pinhole device 42, which comprises a first pinhole lens element 44, a pinhole array 46, and a second pinhole lens element 48. The first pinhole lens element 44 focuses the radiation of the illumination beam path 14 onto the pinhole array 46, while the second pinhole lens element 48 subsequently parallelizes the radiation exiting the pinhole array 46. Consequently, the focal lengths of the first pinhole lens element 44 and of the second pinhole lens element 48 in each case correspond to the distance between the pinhole array 46 and the first pinhole lens element 44 and the second pinhole lens element 48. The pinhole array 46 comprises a multiplicity of pinholes, which are arranged such that they coincide with the array of the light sources 24 and the array of detection pixels 40. In this way it is ensured that the projection of the light sources 24 into the object plane of the object 12 coincides with the projection of the detection pixels 40 in the object plane.

A further embodiment of the illumination device 18 is depicted in FIG. 3b. The illumination device 18 comprises the multiplicity of light sources 24, a microlens array 50, an illumination pinhole array 52, and the illumination optical unit 26. The microlens array 50 comprises a multiplicity of microlens elements, in each case one of which is assigned to one of the light sources 24. The microlens elements of the microlens array 50 focus the radiation coming from the light sources 24 in pinholes of the illumination pinhole array 52. The illumination pinhole array 52 provides point-shaped illumination sources. As a result, it is possible using the illumination pinhole array 52 to produce a multiplicity of point-shaped illumination sources, even if the light sources 24 have an extent at which a point-shaped illumination source can no longer be assumed. The illumination optical unit 26 has a focal length corresponding to the distance between the illumination pinhole array 52 and the illumination optical unit 26, with the result that the radiation of the illumination beam path 14 is parallelized after passage through the illumination optical unit 26.

The microscopy method performed with the microscope 10 is explained in more detail on the basis of FIGS. 4 and 5. The control device 22 divides the multiplicity of light sources 24 into groups 54a and 54b. The section of the illumination device 18 illustrated top left in FIG. 4 shows a magnification in which the individual light sources 24 are visible. One hundred light sources 24 are provided within the section, wherein the light sources 24, designated with numbers, are assigned to two first groups 54a, and those without numbers are assigned to two second groups 54b. The light sources 24 of the plurality of first and second groups 54a, 54b are successively switched on and off in the illustrated sequence as they are indicated by the numbers 1 to 25; in this case, the corresponding light sources 24 of the plurality of first and second groups are switched on at the same time. In the example illustrated in FIG. 4, the light sources 24 designated with "1" are currently switched on. Once they are switched off, all light sources 24 designated with "2" are switched on. Each light source 24 which is switched on at the same time forms an illumination beam for a multispot illumination. In the example shown in FIG. 4, eighteen light sources 24 are switched on at the same time. The light sources 24 are switched in the sequence 1 to 25, wherein the switching-on and switching-off specifies a timing. Once the light sources 1 to 25 have been switched, the light sources 24 of the second groups 54b are in each case switched in the same way. The light sources 24 of a group 54a, 54b are, as explained earlier, imaged into the object plane of the object 12 in such a way that successively switched-on light sources have a distance which is smaller than the Airy diameter, in particular smaller than the Airy diameter. The minimum diameter is illustrated in FIG. 4 by way of circles.

To produce the diffraction image with the method described in DE 102013001238 A1, signals of the detection pixels 40, which correspond to the radiation of the imaging beam path 16 with respect to their intensity and duration, are redistributed in accordance with a sequence that is reversed with respect to the sequence of the switching of the light sources 24. As is illustrated top right in FIG. 4, the detection pixels 40 are also divided, in accordance with the light sources 24, into groups 55a, 55b, and a sequence of the pixel usage is determined that is different than the sequence of the light sources 24. When the light source 24 designated with "1" is switched on, the signals coming from the detection pixels 40 designated "1" are used for the evaluation. The redistribution is thus effected in the sequence defined by the numbers "1" to "25" and separate for each spot of the multispot illumination.

Redistribution of the signals of the detector pixels 40 can be effected in different ways. In one variant, all detection pixels 40 of the detection device 20 are completely read after each switching-on and switching-off of the light sources 24. The control device 22 adds up the signals of the detection pixels 40 according to the sequence reverse to the sequence in which the light sources 24 are switched. In this embodiment, the camera 38 can comprise a CCD array sensor. In an alternative variant, the control device 22 only reads the detection pixels 40 that in each case correspond to the correspondingly switched-on light sources 24. In this case, the detection pixels 40 are continuously illuminated, with the result that the adding-up is effected in the reverse succession with respect to the sequence of the switching of the light sources 24 by the continuous exposure of the detection pixels 40 to light.

In a further embodiment, as is shown in FIG. 6, a CCD array sensor is used for the camera 38. Here, the signals correspond to the charge as produced by the radiation, guided through the imaging beam path 16, in the individual detection pixels 40 of the CCD sensor. The detection pixels 40 are here also continuously illuminated until the light sources 24 of a group 54a, 54b have been switched through. For redistributing the signals, the charges are shifted in the reversed sequence. Due to the fact that the detection pixels 40 are continuously exposed to the radiation of the imaging beam path 16, the redistribution of the signals is, thus, done directly on detection pixel level, specifically by way of the detection pixels 40 being continuously exposed to the radiation of the imaging beam path 16. The mechanical movement of the imaging described in DE 102013001238 A1 is replaced by the shifting of the charges, hence. If the charges have been shifted according to a reversed sequence (regarding switching of the light sources 24), the charges of the detection pixels 40 are transferred to a readout frame 56, and the control device 22 reads the charges.

The light sources 24 are optionally configured to produce beams in different wavelength ranges. It is then possible to illuminate the object 12 at the same time with radiation in different wavelength ranges. One example switching pattern for the light sources 24 is illustrated in FIG. 5. Here, light sources 24 which are switched on at the same time, illustrated in FIG. 5 by the corresponding numerals, are projected into the object plane spaced apart by a minimum diameter. The light sources 24 which are respectively switched on at the same time and are closest to another switched-on light source 24 differ in terms of wavelength range of the emitted radiation. Consequently, the wavelength range of the light sources 24 which are respectively switched-on at the same time alternates. That means that the light sources 24 which emit radiation in the same wavelength range and are switched on at the same time are separated from one another by a light source 24 which emits radiation in a different wavelength range. As a result, crosstalk can be minimized, because the corresponding detection pixels 40 are correspondingly read.

For detecting radiation in a wide wavelength range, the detection pixels 40 comprise a plurality of color pixels 58, which are embodied in each case for a partial region of the wavelength range that is detectable by the detection pixel 40. Arranged upstream of each color pixel 58 in the imaging beam path 16 is a color filter 60 which transmits only radiation in the wavelength range that is to be detected by the respective color pixel 58. The color pixels 58 of a detection pixel 40 are always read at the same time.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A microscope for imaging an object, comprising
   an object plane for arranging the object,
   an imaging beam path, which images the object with a resolution that defines a minimum diameter in the object plane from the object plane into an image plane,
   an illumination beam path, which projects illumination radiation from an illumination device into the object plane, said illumination device having a multiplicity of light sources, said light sources have the form of a 2D array in projection into the object plane, wherein adjacent light sources in the array are arranged at a distance from one another that is smaller than the minimum diameter,
   a detection device having a multiplicity of detection pixels, said detection pixels have the form of the 2D array in projection into the object plane, wherein adjacent detection pixels in the array are arranged at a distance from one another that is smaller than an Airy diameter, and wherein each detection pixel in the array is assigned to exactly one light source, and
   a control device for controlling the detection device and the illumination device,
   wherein the control device divides the light sources in the array into at least one first and one second group, wherein each group is made up of light sources which are mutually adjacent in the array and covers a part of the array,
   wherein the control device switches on only one light source of the first group at a time and switches the light sources of the first group in a clocked sequence, and the light sources of the second group are switched with the same clocking as the light sources of the first group,
   wherein the control device reads the detection device with a clocking that is identical to the clocking of the switching of the light sources, and
   wherein the control device evaluates for each group the detection pixels in the corresponding part of the array in a sequence which is different from the sequence of the switching of the light sources.

2. The microscope as claimed in claim 1, wherein the control device reads all detection pixels simultaneously.

3. The microscope as claimed in claim 1, wherein the control device reads for each group the detection pixels in the corresponding part of the array in a sequence which is reversed with respect to the sequence of the switching of the light sources.

4. The microscope as claimed in claim 3, wherein the control device reads signals of the detection pixels which signals are produced by incident radiation guided by the imaging beam path, wherein the detection pixels are exposed to light until all light sources have been switched.

5. The microscope as claimed in claim 4, wherein the detection device comprises a CCD array sensor and the signals are charges, wherein the charges of the detection pixels are shifted for redistribution.

6. The microscope as claimed in claim 1, wherein for reading the detection device, the control device reads in each clock cycle only the detection pixels that are assigned to the actually switched-on light source in the corresponding part of the array, wherein the control device calculates diffraction images of the object from information of the individual detection pixels based on the switched-on light sources.

7. The microscope as claimed in claim 1, wherein the illumination device is adapted to produce illumination radiation having at least two different wavelength ranges in projection into the object plane, wherein the control device controls the light sources with respect to the wavelength ranges such that light sources emitting radiation of different wavelength ranges have a distance which is greater than the minimum diameter in projection into the object plane.

8. The microscope as claimed in claim 1, wherein each detection pixel comprises at least two color pixels, wherein an individual color filter is arranged upstream of each color pixel and wherein the control device reads all color pixels simultaneously.

9. The microscope as claimed in claim 1, wherein the control device at least twice switches the individual light sources and reads the detection device in the sequence.

10. A microscopy method for imaging an object, comprising the steps of:
    arranging the object in an object plane,
    imaging the object through an imaging beam path from the object plane into an image plane with a resolution that defines a minimum diameter in the object plane,
    projecting illumination radiation from an illumination device into the object plane using an illumination beam path, wherein the illumination device comprises a multiplicity of light sources and the light sources have the form of a 2D array in projection into the object plane, wherein adjacent light sources in the array are arranged at a distance from one another that is smaller than the minimum diameter,
    detecting radiation guided by the imaging beam path with a detection device, which comprises a multiplicity of detection pixels, wherein the detection pixels have the form of the 2D array in projection into the object plane, wherein adjacent detection pixels in the array are arranged at a distance from one another that is smaller than an Airy diameter, and wherein each detection pixel in the array is assigned to exactly one light source,
    dividing the light sources in the array into at least one first and one second group, wherein each group is made up of light sources which are mutually adjacent in the array and covers a part of the array,
    switching on only one light source of the first group at a time, switching the light sources of the first group in a clocked sequence, and switching the light sources of the second group with the same clocking as the light sources of the first group,
    reading the detection device with a clocking that is identical to the clocking of the switching of the light sources, and for each group evaluating signals of the detection pixels in the corresponding part of the array in a sequence which is different from the sequence of the switching of the light sources.

11. The microscopy method as claimed in claim 10, wherein all detection pixels are read simultaneously.

12. The microscopy method as claimed in claim 10, wherein for each group the detection pixels in the corresponding part of the array are read out in a sequence which is reversed with respect to the sequence of the switching of the light sources.

13. The microscopy method as claimed in claim 10, further comprising producing signals of the detection pixels by incident radiation guided by the imaging beam path, wherein the detection pixels are exposed to light until all light sources have been switched through.

14. The microscopy method as claimed in claim 10, wherein the detection device comprises a CCD array sensor and the signals are charges, wherein the charges of the detection pixels are shifted for redistribution.

15. The microscopy method as claimed in claim 10, wherein for reading the detection device, in each clock cycle only the detection pixels that are assigned to the actually switched-on light source in the corresponding part of the array are read out, wherein diffraction images of the object are calculated from information of the individual detection pixels based on the switched-on light sources.

16. The microscopy method as claimed in claim 10, wherein the illumination device is adapted to produce illumination radiation having at least two different wavelength ranges in projection into the object plane, wherein the light sources are controlled with respect to the wavelength ranges such that light sources emitting radiation of different wavelength ranges have a distance which is greater than the minimum diameter in projection into the object plane.

17. The microscopy method as claimed in claim 10, wherein each detection pixel comprises at least two color pixels, and wherein an individual color filter is arranged upstream of each color pixel and wherein all color pixels are read out simultaneously.

18. The microscopy method as claimed in claim 10, wherein the individual light sources are switched through and the detection device is read out at least twice in the sequence.

* * * * *